(12) United States Patent
Evans (10) Patent No.: US 6,199,868 B1
(45) Date of Patent: *Mar. 13, 2001

(54) PISTON ASSEMBLY WITH PISTON RING SUPPORT AND SEALING MEMBER

(75) Inventor: John W. Evans, Sharon, CT (US)

(73) Assignee: Evans Engineering Company, Inc., Sharon, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,195

(22) Filed: Aug. 25, 1997

Related U.S. Application Data

(63) Continuation of application No. 08/541,533, filed on Oct. 10, 1995, now abandoned.

(51) Int. Cl.[7] .......................................................... F16J 9/06
(52) U.S. Cl. ........................... 277/468; 277/467; 277/482
(58) Field of Search .................................. 277/434, 467, 277/468, 482, 489

(56) References Cited

U.S. PATENT DOCUMENTS

| | | | | |
|---|---|---|---|---|
| 1,866,907 | * | 7/1932 | Reiland et al. ....................... | 277/149 |
| 3,751,047 | * | 8/1973 | McGee ................................. | 277/165 |
| 5,490,445 | * | 2/1996 | Rao et al. ............................. | 277/165 |

* cited by examiner

*Primary Examiner*—Daniel G. DePumpo
(74) *Attorney, Agent, or Firm*—Fitch, Even, Tabin & Flannery

(57) ABSTRACT

A piston ring assembly includes a piston, and at least one piston ring positioned within a piston groove. Stabilization and support of the piston is provided by a support arrangement, including at least one support member positioned radially between a back wall of the ring groove and the piston ring. The support arrangement desirably acts to accommodate transverse loads exerted upon the piston during normal operation, and can optionally be configured for enhanced sealing of gasses. Improved engine output and efficiency are achieved.

9 Claims, 3 Drawing Sheets

PISTON ASSEMBLY WITH PISTON RING
SUPPORT AND SEALING MEMBER

This is a continuation of application Ser. No. 08/541,533, filed Oct. 10, 1995.

TECHNICAL FIELD

The present invention relates generally to piston and piston ring assemblies for internal combustion engines, and more particularly to an improved piston assembly including a piston ring with a compressible support and sealing member for enhancing engine efficiency and reducing piston to cylinder wall wear.

BACKGROUND OF THE INVENTION

In a typical internal combustion engine, including a piston and ring assembly reciprocable within an associated cylinder bore, the majority of the cylinder wall wear occurs at the upper portion of the cylinder bore. This is the area of the bore where the face of the one or more piston rings frictionally engages the bore with a scraping action against the cylinder bore surface. In contrast, the lower end of the cylinder bore wall is more lightly loaded, with the piston skirt causing measurably less wear in this lower wall area. As a consequence of these discrepancies in cylinder wear, a cylinder bore tends to become gradually tapered, i.e., exhibiting a relatively larger diameter at the top than at the bottom.

The bore of the cylinder also exhibits considerably more wear in a direction "across" the engine, that is, at those portions oriented 90 degrees to the piston pin, than in a direction along the length of the engine (i.e., in alignment with the piston pin). This phenomenon results from the significantly higher loads exerted by the piston in the direction across the engine as the piston reciprocates within the cylinder bore due to the angularity of the connecting rod with respect to the piston pin. During the power stroke of the engine, the total force pushing down on the piston (due to combustion gas pressure) may often be of a magnitude of many tons of pressure. This extreme force acts against the piston to jam the piston with a side load against the cylinder wall. There is relatively little side loading in the lengthwise direction of the engine (parallel to the piston pins and crank shaft journals) because the connecting rod is straight (i.e., non-angular) at all times with respect to those portions of the cylinder bore. Additional side loads are created by inertia forces of the piston, which forces increase significantly with higher piston weights.

The above-described piston side loads result in the cylinder bore exhibiting wear in an oval shape. Since the heaviest side loads occur during the power stroke, the side of the bore which is loaded during this period of the four-stroke cycle exhibits the most wear. This portion of the cylinder bore is normally referred to as the major thrust side of the bore, with the opposite upper surface of the bore being referred to as the minor thrust side. In the majority of engines currently built and which rotate counterclockwise (as viewed from the rear), the major thrust side is located at the right side of the bore (when viewed from the rear).

In addition to the two above-described normal types of wear (which simultaneously cause the cylinder bore to become tapered, as well as out-of-round), the cylinder bore will often deviate from a true cylinder because of strains caused by unevenly torqued cylinder head fasteners. Distortion can also be caused by abnormal engine temperatures due to general overheating of the engine cooling system, or localized overheating caused by restrictive or clogged cooling passages. These uncontrolled heat effects may cause "low" and "high" spots in the cylinder bore, and may result in the bore wearing to a "wavy" surface (along the axis of the bore) instead of a relatively even taper.

The one or more piston rings of a piston and ring assembly should ideally exert sufficient pressure against the cylinder bore to form a tight seal, thereby preventing leakage of combustion gasses downwardly, and preventing movement of oil upwardly. When a piston ring exerts more pressure than is required to create an effective seal, the result is an undesirable increase in piston ring and cylinder wall wear, and increased engine friction which reduces power, increases engine heat, and raises fuel consumption.

The sides of the piston rings (i.e., the top and bottom surfaces), and the piston ring lands of the piston (which contain the rings) also exhibit wear. While the pistons of an engine move the rings upwardly and downwardly with respect to the cylinder walls, the rings are in constant sideways motion (radially of the piston) to accommodate their reaction to irregularities on the surface of the cylinder wall, and to accommodate movement of the pistons due to side loads. When the top of the piston moves toward the cylinder wall (from side loading) the ring will be forced back into the piston ring groove. There must be sufficient clearance available, in a radial direction behind the ring, so that the ring face may be forced inwardly to become flush with the edge of the piston, without the piston ring "bottoming-out" (in the radial direction) against the back wall of the ring groove. If the piston ring does bottom-out, the impact of the combustion and inertia forces acting upon the piston will be transmitted to the ring, and the ring will eventually break. In order to assure that bottoming-out is avoided, all piston ring lands are machined so that there is normally between 0.005 inches and 0.015 inches clearance radially behind the ring, when the ring face is flush with the outer radial surface of the piston. The space that is established behind the ring is normally referred to as the "back wall area", or the "back wall clearance".

The back wall area also functions to increase the sealing pressure of the ring face on the cylinder bore wall during the combustion stroke, when the normal top and bottom piston ring clearance (i.e., its axial clearance) is all at the top of the ring due to combustion forces pushing the ring tightly against the bottom of the ring groove. The combustion gasses pass though this axial clearance, and raise the gas pressure in the back wall area, thereby forcing the piston ring outwardly to seal more tightly against the cylinder bore wall. To enhance this effect, the back or inside surface of the top piston ring of a piston and ring assembly is typically cut with a chamfer, thereby decreasing the time required for creating sealing pressure in the back wall area, and increasing the pressure therein. When such a chamfer is made in the upper edge of the ring, the combustion gas will flow more readily into the back wall area because the sharp edge of the ring has been removed, thereby reducing turbulence and "squeeze" of the combustion gas. The ring-to-cylinder wall pressure will also be increased because the effective surface area acted upon by the combustion gas is relatively increased.

One of the problems exhibited by all current piston designs is that when the ring bounces, or flutters, within the cylinder bore, the seal at the ring face to the cylinder wall is momentarily lost, and combustion gas leaks past the ring face. This results in a drop in pressure in the back wall area, further reducing the ability of the ring to seal tightly against the cylinder bore wall. Such ring bounce is most often caused by irregularities on the cylinder wall surface (i.e., such as "waviness" described above) or by rapid shifts in the piston from the major thrust side to the minor thrust side of the cylinder bore. Both of these phenomenons occur at higher engine (and piston) speeds. Ring flutter is usually caused by combustion pre-detonation or pre-ignition, which can cause high speed shock waves in the cylinder, and which vibrate the ring causing it to lift off of the cylinder wall.

On the compression stroke of the engine, the compression (i.e., intake charge) pressure pushes down on the piston while the connecting rod resists this pressure by its connection to the piston pin. The combined action of these two forces, in all reciprocating piston engines, pushes or thrusts the piston against that side of the cylinder bore toward which the connecting rod is angled from its connection to the associated crankshaft.

In contrast, during the power stroke, the connecting rod slopes angularly toward the opposite side of the cylinder bore. Combustion gas pushes downward on the piston, and the connecting rod resists this pressure by pushing upward on the piston pin. The combination of these two forces pushes or thrusts the piston against that surface of the cylinder bore opposite the side against which it is pushed during the compression stroke.

In the majority of engines, previously described, the direction of the side thrust acting on the piston changes from one side to the other (from left to right when viewed from the rear) as the piston moves through top dead center (TDC). Within the period from 60 to 0 degrees before top dead center, the piston is thrust (by compression) to the left side of the cylinder bore, with transferring of the side thrust thereafter to the opposite, right side, within about 0 to 10 degrees after the piston passes through top dead center. This change in direction of thrust pulls the piston away from the left side of the bore, and "slaps" it against the right side. If the clearance between the piston and the bore is excessive, an audible noise is heard which is referred to as "piston slap". Excessive clearance can be intentionally provided, such as in racing engines where extra piston clearance is provided because of high piston metal operating temperatures. Excessive clearance may also result from cylinder bore wear described above.

In current engines, which include aluminum pistons, there will ordinarily be no audible piston slap when the pistons and cylinder bores have not been subjected to wear. However, there is ordinarily some degree of thrust rocking occurring. Even if there is audible piston slap (due to inaccurate machining) during the period in which the engine is warming-up, the aluminum pistons usually heat quickly, and expand, thereby reducing the piston/cylinder clearance and eliminating the slapping noise. However, in some instances, current engines are required to operate by design (machine tolerances or load requirements) with excessive piston clearance, and low levels of audible piston slap can exist at all operating conditions.

Rather than being manufactured perfectly round, modern pistons are ground slightly oval ("cam ground"), with the piston typically having a diameter across the pin hole which is about 0.009 inches less than that diameter perpendicular to the hole. Usually, current aluminum pistons are manufactured such that the skirts are ground about 0.0005 inches larger in diameter at the bottom of the skirt. In other words, the skirt flares or tapers outwardly by about this dimension.

After extended periods of service, the thrust forces acting upon the piston skirt gradually reduce its diameter so that the skirt then tapers inwardly, instead of outwardly as described above (i.e., the skirt "collapses"). This reduction in skirt diameter is a result of impacts on the piston skirt caused by the thrusting action of the piston, and is in addition to any normal surface wear of the skirt resulting from friction. Skirt collapse increases the clearance between the cylinder bore and the piston skirt, and results in increased piston slap.

Piston slap can be envisioned as a rocking motion of the piston in the cylinder bore. The rocking action of the piston directly affects the ability of the piston rings to seal, thereby reducing their effectiveness. First, as the piston rocks when new, the unworn piston ring, with a flat surface against the wall, will also be rocked with the piston. The rocking action of the ring face will alternately move the seal area of the ring from the uppermost edge to the lowermost edge of the ring, instead of using the entire ring face. The stresses placed upon these outer ring edges, by the rocking of the piston, rounds off the outer faces of the rings, and further reduces their effectiveness. As the piston rocks left, the lower ring edge is worn away, and as the piston rocks right, the upper edge is worn away. Gradually, as wear due to thrust-rocking continues, the entire ring face is rounded so that even when the piston is vertical in the bore, only a small tangent of the ring face is available to seal the cylinder. Gas pressure leaks down past these rounded surfaces, and oil leaks upward into the combustion chamber affecting emissions and consuming oil.

In recent years, there have been attempts to reduce leakage of combustion gasses past the rings into the crankcase of the engine. Such attempts have been made in order to increase the peak power of the engine, and the specific power of the engine in relation to the fuel consumed (referred to as brake specific fuel consumption of the engine, BSFC). One such method used during recent years is to slightly angle grind the face of the ring which contacts the cylinder wall. This is termed a "tapered face" piston ring and it is designed to establish a single contact point (when viewed in cross-section) at the top of the ring, during early operation of the new engine, which then moves down across the face of the ring from progressive wear. The intent is that the ring will reduce bounce when shifting contact points from the top edge to bottom edge as the piston rocks in the cylinder bore (i.e., the most tapered (lowest) edge will not contact the wall as severely as the least tapered (highest) edge). In some instances where ring flexing is addressed, the angle grind may be opposite to the foregoing (i.e., contact point at the bottom). However, the intent of a single point contact and progressive wear across the ring, from top to bottom, renders the same result. To date, this approach has had some minor improvements realized, but has not significantly corrected the problems. Additionally, attempts have been directed at sealing the end gaps of the rings, which may normally range from a clearance of 0.008 inches up to 0.030 inches per ring. Such gap sealing constructions, which normally use two or more interworking rings, are sometimes referred to as "gapless" or "zero gap". Finally, some attempts have been noted of the use of metallic and nonmetallic gas seals on the back wall side of the piston ring whereby it is intended to seal, or entrap combustion gasses, attempting to pass around the back side of the piston groove. However, heretofore none of these attempts of back wall sealing are known to the present inventor to have addressed the movement of the piston, within the bore, or the need to support the ring with a compressible member which limits the rings ability to move radially into the piston groove. These attempts have not recognized or addressed the problems during dynamic motion of the piston caused by piston thrust, rocking, and the required back wall clearance. In addition, these previous attempts have not corrected the losses in engine efficiency which occur during conditions which cause the piston ring to flutter, bounce, and erode away the sealing surface. In fact, all such previous attempts known to the present inventor specifically address the need to allow the piston ring to move freely within the ring groove radially to the full extent in order to avoid bottoming (loading) the ring between the piston groove back wall and the cylinder bore wall when the piston rocks, or thrusts, toward the wall.

SUMMARY OF THE INVENTION

The above-discussed problems resulting from piston side thrusting and rocking, including audible piston slap, ring bounce and flutter, are solved, in accordance with the present invention, by utilizing the dynamics of a pre-loaded, compressible combined sealing and energy suspension or support member positioned between the piston ring and the piston. The dynamic action of the piston ring support and sealing member is further augmented by the ability of the support member to seal and effectively trap combustion gasses behind the ring during periods of high engine revolutions per minute (rpm), whereby the combustion gasses are used to further stabilize the ring seal.

In accordance with the present invention, a piston assembly for an internal combustion engine comprises a piston for reciprocable movement within an associated cylinder bore of the engine. The piston defines a ring groove extending about the periphery of the piston. The assembly further includes a piston ring positioned within the ring groove extending about the periphery of the piston for sliding engagement with an internal wall of the cylinder bore.

In accordance with the present invention, at least one compressible support member is provided positioned radially between the piston ring and the back wall of the ring groove. The support member supports the piston and ring with respect to each other, thereby minimizing transverse movement of the piston with respect to the piston ring and the cylinder bore wall, while also maintaining stable contact, and sealing, between the ring face and wall.

In one embodiment of the present invention, a plurality of support members are provided, and are configured to primarily effect support of the piston with respect to the piston ring. In this embodiment, the gasses within the cylinder act against the piston ring to effect sealing in a generally conventional manner. In contrast, in an alternate embodiment of the invention, the support member not only functions to support and stabilize the piston with respect to the piston ring, the support member further acts to assist in effecting a gas seal at the back wall area of the piston ring and associated piston land.

In a further embodiment, piston support and ring sealing are effected, together with a positive sealing of the piston ring end gap at the cylinder wall interface.

By the present invention, the piston is desirably held in a more upright orientation in the cylinder bore, with reduced canting, thereby reducing the high frictional forces to which the edges of the piston ring are ordinarily subjected. Since "point loading" of the ring is avoided, lower temperatures are achieved, with an increase in ring contact with the cylinder wall desirably enhancing ring efficiency and sealing.

Other features and advantages of the present invention will become readily apparent from the following detailed description, the accompanying drawings, and the appended claims.

BRIEF DESCRIPTION OF THE DRAWINGS

FIGS. 4 and 4a are is a fragmentary, cross-sectional schematic views illustrating a piston assembly embodying the principles of the present invention;

FIG. 4a is a fragmentary, cross-sectional schematic view illustrating a piston assembly embodying the principles of the present invention, and illustrating a support member having a rectangular cross-section (23).

DETAILED DESCRIPTION

While the present invention is susceptible of embodiment in various forms, there is shown in the drawings and will hereinafter be described presently preferred embodiments of the invention, with the understanding that the present disclosure is to be considered as an exemplification of the invention, and is not intended to limit the invention to the specific embodiments illustrated.

Figure 1A:
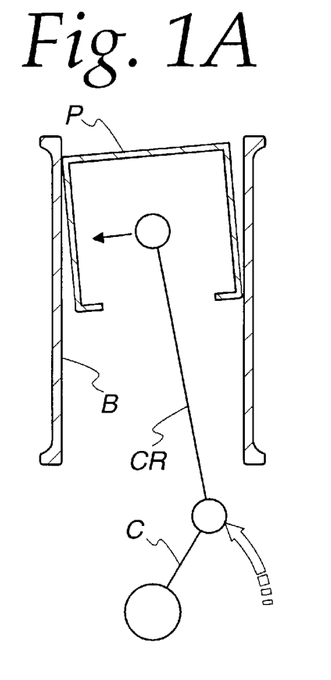
FIGS. 1A to 1C are schematic illustrations of a piston and cylinder of an internal combustion engine illustrating the forces acting upon the piston and connecting rod attendant to engine operation.
Figure 1B:
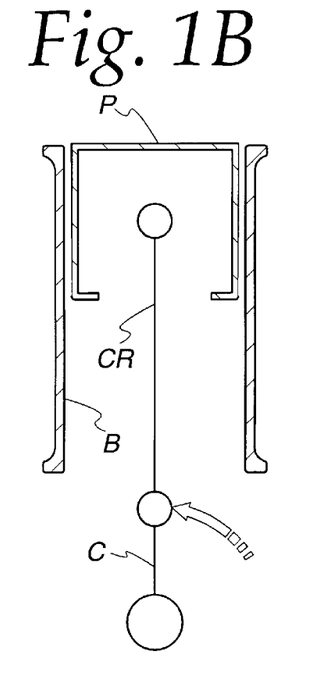
Figure 1C:
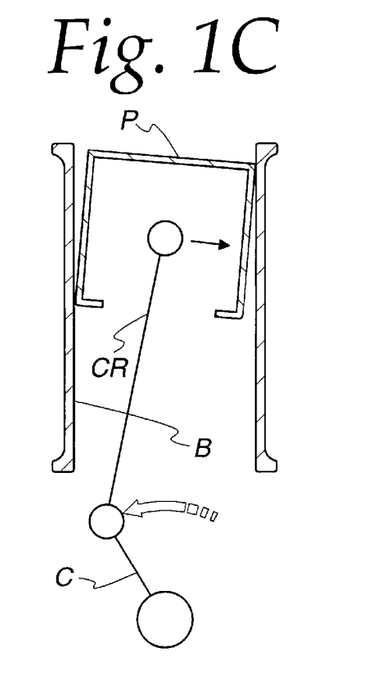

With reference first to FIGS. 1A to 1C, therein is schematically illustrated a typical internal combustion engine including a piston P reciprocably movable within an associated cylinder bore B. Connecting rod CR connects the piston P with the associated crankshaft C.

FIGS. 1A to 1C illustrate the typical rocking motion to which piston P is subjected during normal operation of the engine. As shown in FIG. 1A, during the compression stroke of the engine, the angularity of the connecting rod CR with respect to the cylinder bore B results in thrust loading of the piston against the cylinder bore generally in the direction indicated by the arrow. As the piston moves through top dead center (FIG. 1B), and through its power stroke (FIG. 1C), thrust loading acts against the opposite side of the cylinder bore. As discussed hereinabove, the "minor thrust side" is that portion of the cylinder bore subjected to such thrust loading during the compression stroke, while the "major thrust side" is that portion of the bore subjected to thrust loading during the power stroke. The movement of the piston from the orientation illustrated in FIG. 1A to that illustrated in FIG. 1C is that associated with so-called "piston slap", the audible phenomenon that results from the rocking-like motion to which the piston is subjected.

Figure 3A:
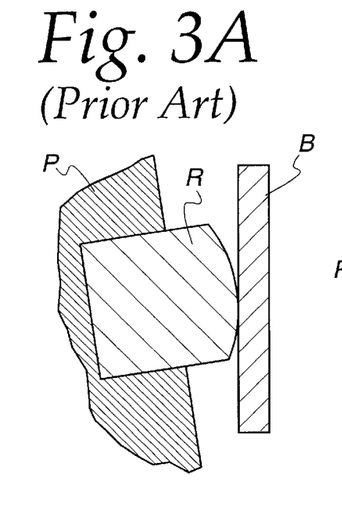
FIGS. 3A to 3C are fragmentary, schematic illustrations of a piston and piston ring assembly attendant to rocking motion of the piston in an associated bore.
Figures 3B, 3C:
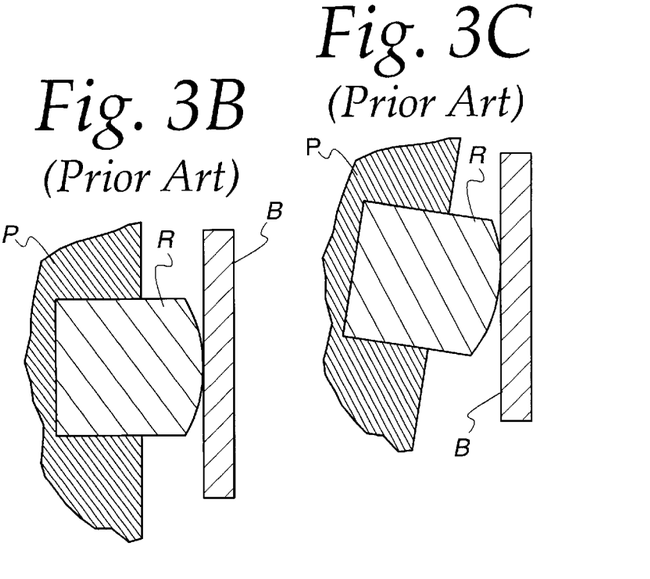

FIGS. 3A to 3C generally correspond to FIGS. 1A to 1C illustrating piston P, and one of its associated piston rings R with respect to the associated cylinder bore B. The rocking-like piston motion within the bore results in stresses being placed upon the upper and lower edges of piston ring R, rounding off the outer faces of the ring as illustrated in FIGS. 3A to 3C. As noted, this wear can result in irregular, often rounding, of the piston ring face, thereby impairing its sealing coaction with the associated cylinder bore.

Figure 2:
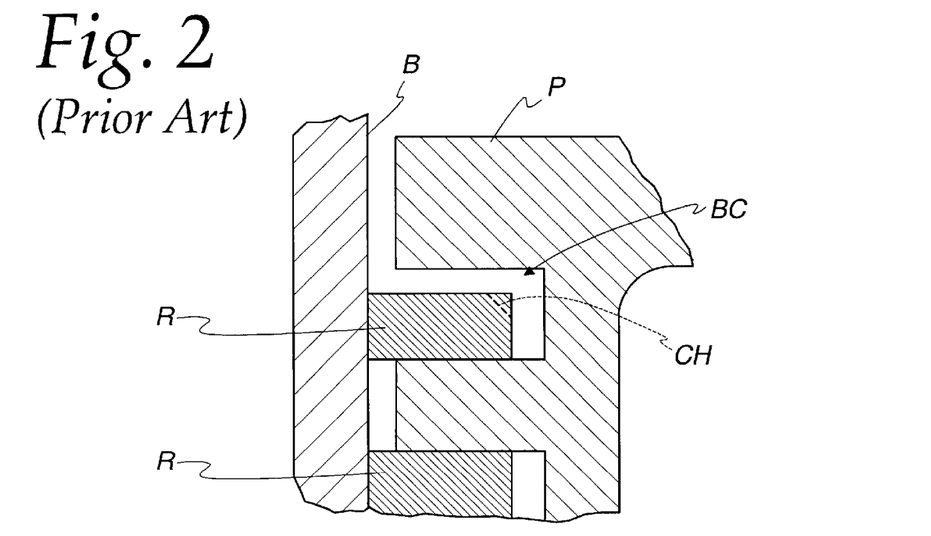
FIG. 2 is a fragmentary cross-sectional schematic view of an engine piston and piston rings positioned within an associated cylinder bore.

FIG. 2 illustrates generally a part sectional view of a three (3) ring conventional spark ignition piston assembly, including piston P, and the top and second compression rings R-1 and R-2 in engagement with associated cylinder bore B. In this generally conventional design, radial clearance between the top ring groove and the rearward face surface of top ring R-1 provides "back wall area" or "back wall clearance", thereby providing sufficient clearance to preclude the piston ring from bottoming-out within the associated groove. This back wall clearance, designated BC in FIG. 2, also provides a region for combustion gas to act against the rearward surface of the piston ring R-1, thereby urging the ring outwardly into sealing engagement with the associated cylinder bore. As discussed above, the compression ring R-1 may be chamfered, such as illustrated in phantom line at CH, to enhance this gas-sealing effect. The second piston ring R-2 may also be subject to some enhanced sealing due to combustion gasses acting thereagainst, or may alternately be configured as a secondary oil scraper ring for urging oil downwardly from the cylinder bore wall into the crankcase region of the engine. In some instances, when only two rings in total are used, the second ring is a dedicated oil ring and the top R-1 ring the only compression ring.

Figures 4, 4A:
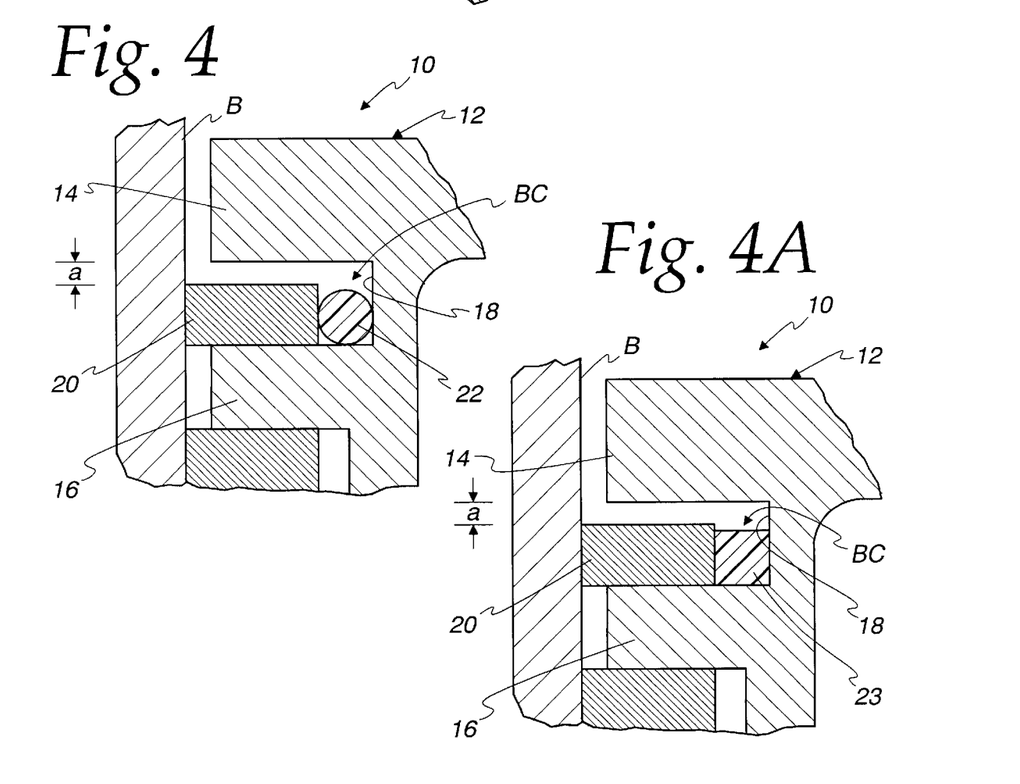

With reference now to FIG. 4, therein is illustrated a conventional three ring piston assembly 10 embodying the principles of the present invention (oil ring not shown). The piston assembly 10 includes a piston 12 having a top land 14 and a second land 16 which together define a piston top ring groove 18 extending about the periphery of the piston 12.

The piston assembly includes a piston top compression ring 20 positioned within ring groove 18 for sealing engagement with associated cylinder bore B. The upper and lower axial faces of the piston ring 20 are dimensioned with respect to the piston ring groove 18 to define an axial clearance "a" illustrated between the upper face of the ring and the lower surface of top land 14. This axial clearance exists between the top of the ring and the bottom of the land 14 when the ring is positioned in its lowest position with respect to groove 18, with the lower axial face of the ring 20 pressing against the groove surface provided by second ring land 16. In this position of the ring 20, the back wall area or back wall clearance of the assembly, designated BC, is formed, defined by the inner or radial groove face of the ring, the upper surface of land 16, the back wall of ring groove 18, and the lower edge surface of top land 14.

In accordance with the present invention, a compressible support and sealing member 22 is positioned radially between the piston ring 20 and the ring groove 18. In this embodiment, the support and sealing member 22 extends continuously about the circumference of the ring groove 18, thus providing continuous support for the piston and associated piston ring 20. Significantly, the support and sealing member 22 acts against the piston ring and the back wall of the groove 18 for supporting the piston ring with respect to the back wall, thereby minimizing transverse movement of the piston 12 with respect to the piston ring 18 and the associated cylinder bore wall B while also maintaining stable contact, and sealing, between the ring 20 face and cylinder bore wall B.

It is presently preferred that when employing a high temperature elastomer as further described below, the support and sealing member 22 be installed in the ring groove with 0.004 inches per side "crush", (static pre-load on the bore radius) yielding a total static load across the cylinder bore (the diameter) of 0.008 inches crush with the piston P installed in the cylinder bore. Testing has shown that generally, the pre-loading of 0.008 inches (across the diameter) of pistons in the 3.0 inch to 4.0 inch diameter range is usually ideal. However, it will be understood that as diameters, loads (horsepower), rpm, and piston weights vary, so will the acceptable static crush requirement. Experience has shown that the measure of acceptability must be a careful evaluation that balances the gains achieved from improved piston stability and ring seal, as compared to any increase in ring-to-cylinder wall drag (friction) at the ring interface. It will be appreciated that any time the crush or pre-load of the support and sealing member 22 is raised, there will be a corresponding increase in the pressure on the face of the piston ring 20.

The following table sets forth data quantifying the frictional penalties imposed upon employing a support and sealing member 22 configured to provide 0.008 inches of crush on two representative piston sizes. One piston tested was 3.185 inches in diameter, and the other piston was 4.060 inches in diameter. The tests were run using only the two compression rings for the pistons, with the third oil ring for each piston removed. Typically, the oil ring accounts for one-half of the ring drag, and therefore its removal in the testing assisted in effectively quantifying the losses incurred with the increased load on the compression ring.

Each piston tested used a standard 0.0625 inch piston ring (i.e., the ring groove axial dimension) with such a ring having an axial dimension of about 0.060 inches, and a radial dimension of about 0.154 inches. The support and sealing member 22 was provided in the form of an O-ring type seal, with a circular cross-section, and a sectional width of about 0.057 inches.

The test bore was prepared by honing with a No. 800 grit stone, and polishing with crocus cloth to a smooth finish. The resultant smooth surface finish of the test bore approximated some normal run-in wear (i.e., approximately the same amount of run-in wear as would be exhibited on an internal combustion engine of an automobile after 10,000 miles of operation). The testing consisted of: 1) a static pull test on the piston only, moving from one end of the bore to the other; and 2) a rotational test of the cycling piston with the crankshaft and connecting rod installed and rotating. Each test measured break-away resistance (pounds) and sustained pull or rotation (inch pounds).

TABLE 1

| | STATIC PULL (lbs.) | | ROTATIONAL (in-lbs.) | |
| --- | --- | --- | --- | --- |
| | Break-Away | Sustained | Break-Away | Sustained |
| Conventional Ring: | | | | |
| 3.185" | 10 lbs. | 7 lbs. | 23" | 17" |
| 4.060: | 13 lbs. | 12 lbs. | 40" | 27" |
| Supported Ring Pre-Load: 0.008"): | | | | |
| 3.185" | 13 lbs. | 8 lbs. | 30" | 23" |
| 4.060" | 18 lbs. | 17 lbs. | 45" | 35" |

Figure 6:
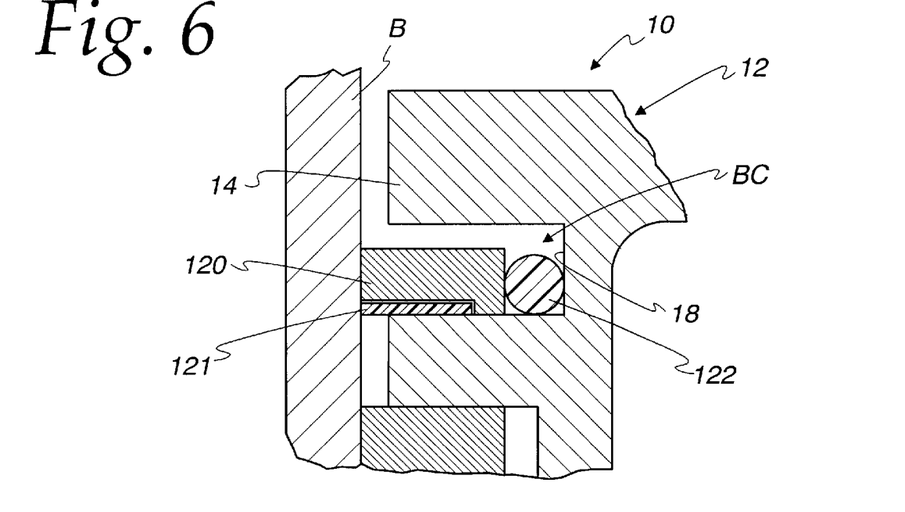
FIG. 6 is a fragmentary cross-sectional view similar to FIG. 4 illustrating a further embodiment of the present invention.

The following quantitative power testing (Table 2) shows results of water brake dynamometer testing comparing conventional piston rings with the piston assemblies configured in accordance with the embodiments of the invention shown in FIGS. 4 and 6. Pistons having the same diameter of 3.185 inches as used in Table 1 above, were tested. The test apparatus, specifications, and procedures are detailed at the end of Table 2, below.

TABLE 2

DYNAMOMETER TEST

| | RPM | Corrected Torque | Corrected HP | BSFC 1 lb/Hphr | Friction HP | Ring Blow-By |
|---|---|---|---|---|---|---|
| Baseline: | 4500 | 88.6 | 81.9 | .65 | 18.4 | 145 CFH |
| | 4750 | 90.2 | 81.6 | .68 | 18.6 | 145 CFH |
| | 5000 | 86.7 | 82.5 | .66 | 19.6 | 145 CFH |
| | 5250 | 84.4 | 84.4 | .68 | 21.7 | 145 CFH |
| | 5500 | 81.7 | 85.6 | .70 | 23.5 | 145 CFH |
| | 5750 | 76.3 | 83.5 | .76 | 26.0 | 145 CFH |
| | 6000 | 71.2 | 81.3 | .76 | 28.2 | 170 CFH |
| (Average): | | (82.7) | (82.9) | (.699) | (22.3) | (157.5) |
| Modified: (FIG. 4) | 4500 | 95.9 | 88.8 | .66 | 19.9 | 140 CFH |
| | 4750 | 96.1 | 86.9 | .62 | 20.2 | 140 CFH |
| | 5000 | 94.6 | 90.1 | .59 | 21.0 | 140 CFH |
| | 5250 | 91.1 | 91.1 | .63 | 23.1 | 140 CFH |
| | 5500 | 87.0 | 92.1 | .69 | 25.2 | 140 CFH |
| | 5750 | 82.9 | 90.8 | .69 | 27.5 | 140 CFH |
| | 6000 | 80.1 | 91.5 | .71 | 29.8 | 160 CFH |
| (Average) | | (89.8) | (90.2) | (.656) | (23.8) | (150.0) |
| Average Loss/Gain | | +8.6% | +8.8% | -6.2% | +6.7% | -4.8% |
| Modified (FIG. 6) | 4500 | 97.7 | 90.3 | .56 | 19.7 | 130 CFH |
| | 4750 | 97.6 | 88.3 | .60 | 20.1 | 130 CFH |
| | 5000 | 94.8 | 90.3 | .60 | 20.8 | 130 CFH |
| | 5250 | 91.5 | 91.4 | .63 | 23.0 | 130 CFH |
| | 5500 | 88.3 | 92.5 | .64 | 24.9 | 130 CFH |
| | 5750 | 84.3 | 92.3 | .63 | 27.2 | 130 CFH |
| | 6000 | 80.4 | 91.9 | .68 | 29.4 | 140 CFH |
| (Average) | | (90.6) | (91.0) | (.620) | (23.6) | (135.0) |
| Average Loss/Gain (over baseline) | | +9.7% | +9.8% | -11.3% | +5.8% | -14.2% |

The engine dynamometer tests, above, were performed using four of the same 3.185" type pistons described above in the frictional "drag" tests (Table 1). The pistons were installed in a four cylinder, 1.6 liter engine and baseline tests (conventional piston rings) were run in order to observe the typical operating characteristics of the engine with the conventional type piston rings installed (#3 oil groove ring was used). Measurements were taken to record observed engine functions of torque ("TQ"), horsepower ("HP"), brake specific fuel consumption ("BSFC", measured in pounds of fuel consumed, per horsepower, per hour "lb/Hphr"), and piston ring leakage in cubic feet per hour ("CFH" of Blow-by). All observed functions were then converted to engineering "standard corrected results" for the temperature, vapor pressure, and barometric pressure of the day. After the completion of the baseline tests the pistons were removed from the engine and the piston ring lands were machined to accept the ring support and seal of the present invention. The radial depth of the ring land was set (back wall diameter) to effect the same 0.008 inch pre-load on the top ring as used in the above frictional testing (Table 1). After machining, the pistons were reinstalled in the engine and the modified engine was dynamometer tested to observe the same functions as recorded in the baseline testing. All functions were again converted to "standard corrected results" for the day. During both the baseline and the modified tests the following factors were held constant:

Coolant: 200° F.
Oil: 190° F.
Carb Air: 80° F.
Ignition: 38° BTDC
Air Fuel: 14.7 to 14.8 (stoichiometric mixture ratio)
Oil PSI: 32 to 35 PSI (engine oil pump)

Ten 250 RPM step tests were run from a starting RPM of 4500 to an end test RPM of 6000, at full load and wide open throttle, in both baseline and the modified configurations (10 complete runs each configuration). During the step tests, the dynamometer was computer controlled to hold at each 250 RPM test point, until the engine stabilized for 2 to 3 seconds, and then subsequently was elevated to the next higher 250 RPM point, held at that RPM until the engine stabilized, again advanced 250 RPM, and so on, until the end test RPM was reached. The results, when comparing the two embodiments of the present invention with the conventional piston and ring assemblies, showed that the modified piston assemblies (support/seal piston ring) of FIG. 4 produced an average improvement of approximately 8.5% in power ("HP" and "TQ") with decreases in fuel consumption ("BSFC") of 6.2% and cylinder leakage ("Blow-by") of 4.8%. The piston assemblies in accordance with the embodiment of FIG. 6 produced an average improvement of approximately 9.7% in power with decreases in fuel consumption of 11.3% and cylinder leakage of 14.2%.

The dynamometer testing showed that it was the use of the piston assemblies in accordance with the present invention that caused the significant gains in both corrected torque and corrected horsepower. Motoring friction horsepower loss quantified that the horsepower and torque gains were not caused by reduced friction, but rather by improved ring efficiency including better piston to cylinder seal with reduced blow-by. Piston skirt friction is believed to be reduced by the tendency of the support and sealing member assemblies to maintain the pistons more concentrically within the cylinder bores with reduced piston skirt to cylinder bore wall contact.

In operation of the embodiment of the present invention shown in FIG. 4, the piston 12 is stabilized and remains vertically upright while the back wall clearance BC is sealed by the function of the compressible support and sealing member 22 for any position, load, and speed of the piston 12. With the support and sealing member 22 installed at a pre-load of 0.004 inches radially, the top ring 20 is held lightly against the cylinder bore B at the outer face of the ring. The piston 12 is thereby, in effect, suspended in the compressible support and sealing member 22 circumferentially around the entire piston 12. Movement of the piston top land 14 in any direction causes a reduction in the distance between the inner radial back wall face of the ring 20 and the back wall of groove 18. Such movements will cause compression of the support and sealing member 22, thus creating resistance to any continued movement of the piston 12 and the top land 14 toward the cylinder bore B.

Normally, the support and sealing member 22 needs to be only lightly pre-loaded (e.g., 0.004 inches radially) when the sealing member is formed from presently preferred elastomeric materials. Such materials include perfluoroelastomer such as Kalrez, available from DuPont, with a durometer in the range of 65–95 (Shore A). Other suitable materials include fluorocarbon-based compounds such as Viton (DuPont), Fluorel (3M Company), and Technoflon (Montedison) exhibiting durometers of 50–95. Fluorosilicone, such as Silastic LS (Dow Corning Corporation) exhibiting a duromoter of 50–80 may be employed. Silicone material, such as Silastic (Dow Corning), exhibiting a durometer of 25–80 may also be employed.

Because such materials exhibit an increasing rate of resistance, when compressed, the piston 12 and the top land 14 will be subjected to greater resistance to movement of the top land toward the cylinder bore B for each 0.001 inches of movement of the back wall of the ring groove 18 toward the inner face of the piston ring 20. Provided that the durometer rating, and the area across the support and sealing member 22 is adequate, the previously described forces which act upon the piston 12 will be absorbed by the compression of the support and sealing member 22 as the forces act to cause closure of the back wall clearance BC. Accordingly, contact of the top land 14 with the bore B, and the opposite side of the skirt of piston 12 with the opposite side bore B (not shown) is avoided. As a consequence, the audible noise of piston slap is desirably avoided, as well as the previously described wear of the piston assembly and associated cylinder bore.

Additionally, during operation of the embodiment of the present as illustrated in FIG. 4, the tendency of the piston ring 20 to bounce or flutter is again resisted by the support and sealing member 22 resisting closure of the back wall clearance BC. Here also, each 0.001" movement of the ring groove 18 back wall face radially toward the ring 20 inner back wall face will increase the resistance of the ring to flutter and bounce, thereby increasing the ring 20 face seal against the cylinder bore.

As noted, it is presently preferred that a durometer rating for the support and sealing member 22 be selected in the range of about 50 to about 95 (Shore A). The use of a support member having a circular cross-section, with a cross-sectional diameter of 0.157 to 0.061 inches has been found to be appropriate for a piston ring with an axial ring groove dimension of about 0.0625 inches to about 0.15625 inches (conventional ¹⁄₁₆" and ⁵⁄₃₂", respectively) in order to properly fill the back wall clearance BC. If it is found that the increased resistance to the closure of the back wall clearance is necessary, several methods may be employed to increase such resistance. For example, the durometer or sectional area of the support and sealing member 22 may be increased, or the back wall clearance BC around the support and sealing member 22 may be reduced. Such reduction of the back wall clearance BC may be accomplished such as by lowering the portion of the top land 14 which defines the back wall clearance BC, or "form fitting" the support and sealing member 22 to be generally complemental in cross-sectional configuration to the cross-section of the back wall clearance BC to more completely fill the back wall clearance. In the event that the surface of the groove at the back wall clearance BC is lowered, sufficient clearance must be provided to avoid contact with the inner face of the piston ring 20. If a "form-fitted" support and sealing member 22 is employed, such a member (such as being provided with a rectangular cross-section) exhibits significantly higher resistance than a circular cross-sectional member which partially fills the back wall clearance region (for the same durometer rating). In keeping with the principals disclosed herein, the cross-sectional configuration of the support and sealing member 22 may be other than circular or rectangular.

In the operation of the preferred embodiment of FIG. 4, the support and sealing member 22 will effect a complete seal, at all times, between the piston ring 20, the back wall of the groove 18, and the top surface of land 16 if the support and sealing member 22 is in complete contact with such surfaces. Complete contact with the above-described surfaces is made when there is a minimum contact fit but a non-pre-loaded condition ("contact" with zero crush) across the support and sealing member diameter, up to and including a high pre-load condition (heavy crush). When such a complete seal condition is established by the support and sealing member 22, any gases which enter and cause a rise in pressure in the back wall clearance area cannot pass around the support and sealing member 22, even if the piston ring 20 has been caused to lift off of the upper surface of the land 16.

Because the gases are prevented from escaping around the ring, the gasses pass along the circumference of the piston 12, and create high sealing forces which push downward on the top surface and rear face of the piston ring 20, as the gasses urge the support and sealing member 22 into tighter engagement against the captive surfaces of the groove 18.

The resultant increase in pressure against the top and rear surfaces of the piston ring 20 act to keep consistent pressure on the ring, thus reducing piston ring bounce and flutter, with the ring face held more consistently against the cylinder bore B. Preventing the ring from bouncing, or fluttering, off of the cylinder wall reduces ring leakage and damage, improving engine efficiency, power, fuel economy, and emissions.

In contrast to the combustion, exhaust, and compression strokes, all of which create forces which put pressure above the piston ring 20 and at the rear surface thereof above support and sealing member 22, the support and sealing member 22 also assists in sealing during the intake stroke of the engine. During this phase of engine operation, forces are in a direction acting to lift the ring 20 generally off of the land 16. In conventional pistons, during a portion of the intake stroke, the lifting of the piston ring ordinarily creates an open space above and below the ring, whereby there is reduced axial clearance above the ring. During such transient axial positions of the ring, a channel is created around the ring whereby the vacuum in the cylinder above the piston draws gasses (which exist in the crankcase below the piston) through the channel momentarily established around the ring and into the cylinder above the piston.

With the support and sealing member 22 installed and effectively sealing the back wall clearance BC, such a channel around the ring is effectively sealed during transient axial positions of the ring during the intake stroke. Such positive sealing of the piston ring during the intake stroke, and the resultant elimination of crank case dilution of the intake charge, will reduce carbon monoxide emission levels of the engine. Additionally, because there is no "pumping" effect of the clearance areas around the piston ring, the unburned fuel which usually enters the transient channel during the intake stroke and which remains there until the exhaust stroke, is reduced because the channel is "deadheaded" by the support and sealing member 22. Any reduction in the "hidden" residual fuel volumes in the clearance areas above and to the rear of the piston ring will desirably result in a reduction in engine emissions of unburned hydrocarbons.

If it is desired to install the support and sealing member 22 in a piston while avoiding any increase in the force exerted by the piston ring against the cylinder bore, then a balance between piston ring spring tension, support and sealing member durometer, and support and sealing member pre-load (crush) can be established. The effective spring rate compression of the durometer and pre-load of the support and sealing member 22 can be calculated, and then a like "rate" of material may be removed from the back wall of piston ring 20 which will decrease the effective spring rate of the ring by an amount equal to the spring rate of the support and sealing member 22. In such a modification, the radial dimension of the piston groove 18 is increased (toward the ring) by a dimension which corresponds to the material removed from the back face of the piston ring, thereby keeping the pre-load value on the support and sealing member 22 constant (at the desired crush) while not increasing the ring-to- cylinder wall pressure above the original value.

Figure 5:
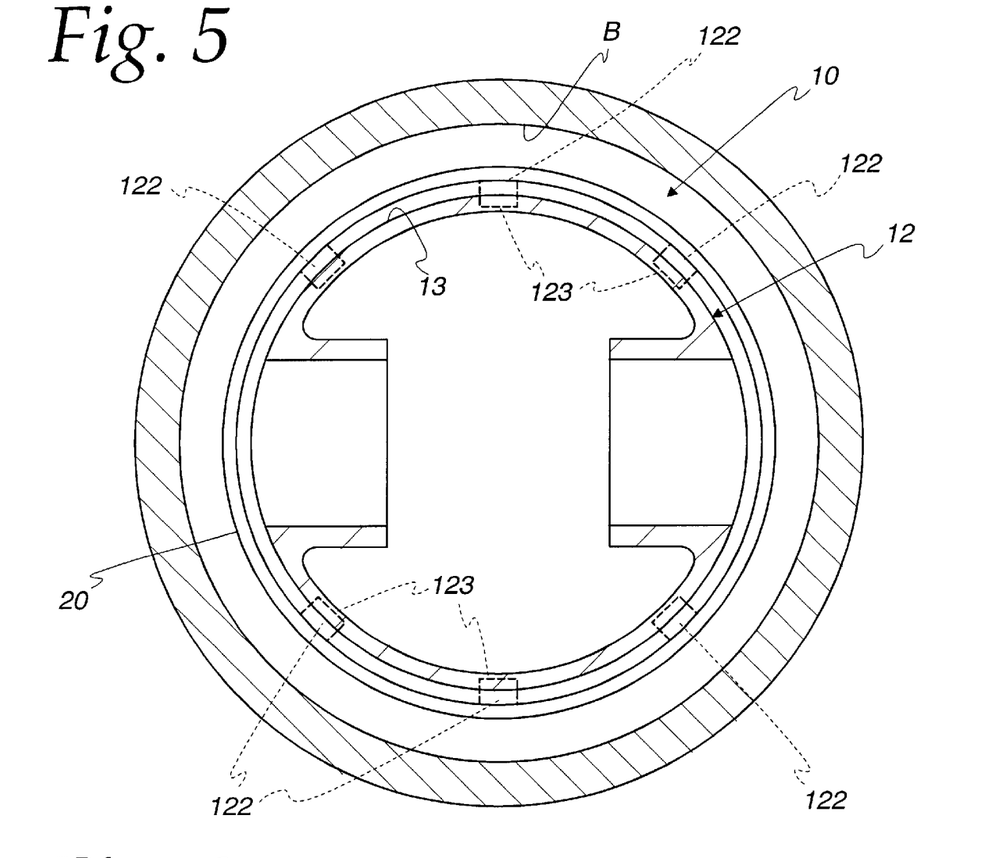
FIG. 5 is a cross-sectional view, taken generally across a ring groove of a piston and its associated cylinder bore illustrating an alternate embodiment of the present invention.

A further embodiment of the present piston assembly is illustrated in FIG. 5. In this embodiment, a suspension or support system and ring 22 face seal is provided for the piston and piston ring, without attendant back wall sealing, such as provided by previously described support and sealing member 22. In this embodiment, like reference numerals are employed to indicate those elements generally as in the previously described embodiment.

As illustrated in FIG. 5, piston assembly 10 includes a piston 12 (shown in cross-section) including a ring groove 18 within which is positioned a circumferentially extending piston ring 20 (for clarity, ring 20 is shown in spaced relationship to cylinder bore B, normally engaged by the ring). In this embodiment, support and stabilization of piston 12 and piston ring 20 is provided by a plurality of circumferentially spaced support members 122 positioned within the ring groove 18 for engagement with the rearward or back face of the piston ring 20.

The support members 122 are preferably formed from compressible material, including elastomeric material, and may be inset into the back wall of the piston groove 18, such as illustrated in phantom line at 123. It will be understood, however, that alternate forms of attachment may be employed to avoid counter boring the inner surface of the groove. For example, the support members 122 may be chemically bonded to the inside surface of the piston groove 18. Because the support members 122 function to provide support and suspension, and ring 20 face to cylinder wall sealing only (and not any back wall sealing), metallic material may be employed for the support members, such as the provision of small coil springs positioned within suitable insets as 123.

The use of support members in accordance with the embodiment of FIG. 5 would be appropriate in those applications where passage of combustion gasses downwardly, or crankcase gasses upwardly, past the back wall ring groove 18 and associated ring 20 would not be of concern. In other respects, however, the compressible support members 122 function like the previously-described support and sealing member 22, in that thrust movement of the piston 12 causes a condition wherein movement of the piston ring toward the back wall surface of the piston groove is resisted by the compression of the support members 122. Again, stability of the piston is achieved, with improved resistance to rocking and piston slap, and control of the losses of piston ring 20 face seal to cylinder wall B from conditions of bounce and flutter are likewise achieved. While the illustrated embodiment shows six of the support members 122, it will be appreciated that the specific number and spacing of such discrete and individual support members can be varied while keeping the principles disclosed herein.

A further embodiment of the present invention is illustrated in FIG. 6, with components like those of the previous embodiments indicated by like reference numerals. This embodiment differs from the previous embodiment of FIG. 4, in that a piston ring 120 is provided together with an end gap seal ring 121 for sealing the end gap of the piston ring. In this embodiment, the piston ring 121 is machined with an "L" stepped groove in the lower axial face thereof so that end gap sealing ring 121 may be retained within the ring groove 18.

The end gap seal ring 121 is installed in the groove of ring 120 typically with an axial and radial clearance of 0.0005 inches to avoid binding or locking. The use of an end gap seal ring 121 in combination with a support and sealing member 22 in accordance with the present invention desirably acts to further effect sealing of the piston 12 and piston ring 120. In such an arrangement, the end gap of piston ring 120 is positioned 180 degrees from the end gap in seal ring 121 (i.e., the end gaps are diametrically opposed with respect to each other). As a consequence, solid portions of each of the rings 120, 121 are positioned at the end gap of the other one of the rings, with an oil film sealing the tight clearance between the ring 120 and the seal ring 121. This desirably acts to effect substantially complete sealing of the end gap of the top ring 120. Dynamometer testing of this embodiment of the present invention is reported above.

Although the present invention has been described in association with a top ring and groove of a piston assembly, it will be understood that various combinations of locations can be employed. It is within the purview of the present invention to provide the support and sealing member of the present invention in association with the lower or second ring and groove of a piston, or in both the top and second rings and grooves combined, as well as other variations thereof.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The specification is intended to cover, by the appended claims, all such modifications as fall within the scope of the claims.

What is claimed:

1. A piston assembly for an internal combustion engine, comprising:

a piston for reciprocable movement within an associated cylinder bore of the engine, said piston defining one or more ring grooves extending about a periphery of said piston;

a piston ring positioned within each of said grooves and extending about the periphery of said piston for sliding engagement with an internal wall of said cylinder bore; and a piston ring compressible support means comprising a plurality of elastomeric support elements positioned radially between said piston ring and a back wall of at least one of said ring grooves for supporting said piston ring with respect to said back wall, thereby minimizing transverse movement of said piston with respect to said piston ring and said cylinder bore, the support elements spaced about the periphery of said ring groove and said piston, the compressible support means effective for exerting a uniform pressure around the piston and piston ring for maintaining the piston concentrically within the cylinder bore during operation; the compressible support means effective for providing a substantially complete seal to minimize leakage of gases or oil upwardly and downwardly around said piston rings and past the wall face of said piston ring and through said piston ring groove.

2. The piston assembly in accordance with claim 1, wherein said piston ring support means extends about the entire periphery of said ring groove and said piston.

3. A piston ring assembly in accordance with claim 1, including an end gap sealing ring positioned adjacent to at least one of said piston rings for effecting sealing of an end gap thereof.

4. The piston assembly in accordance with claim 2, wherein said support means comprises an elastomeric support member having a generally circular cross-section.

5. The piston assembly in accordance with claim 2, wherein said support means comprises an elastomeric support member having a rectangular cross-section.

6. The piston assembly in accordance with claim 2, wherein said support means comprises an elastomeric support member generally complemental in cross-sectional configuration to a cross-section of a back wall clearance defined between said ring groove and said piston ring.

7. A method of supporting a piston assembly for an internal combustion engine having a cylinder bore, comprising the steps of:

providing a piston for reciprocable movement within said cylinder bore, wherein said piston defines one or more ring grooves extending about the periphery thereof;

providing a piston ring positioned within each of said grooves and extending about the periphery of said piston for sliding engagement with an internal wall of said cylinder bore; and supporting said piston ring with a compressible support member comprising a plurality of elastomeric support elements positioned radially between said piston ring and back wall of at least one of said grooves for supporting said piston ring with respect to said back wall to thereby minimize transverse movement of said piston with respect to said piston ring and cylinder bore, the support elements spaced about the periphery of said ring groove and said piston, the compressible support member effective for providing support uniformly around the piston and piston ring for maintaining the piston concentrically within the cylinder bore during operation.

8. A method of supporting a piston assembly in accordance with claim 7, including supporting said piston ring continuously about the entire periphery of said ring groove.

9. A method of supporting a piston assembly in accordance with claim 8, including sealing an end gap of said piston ring by providing a second end gap sealing ring positioned adjacent to at least one of said piston rings.

\* \* \* \* \*